US009097359B2

(12) United States Patent
Ito et al.

(10) Patent No.: US 9,097,359 B2
(45) Date of Patent: Aug. 4, 2015

(54) PIEZOELECTRIC VALVE, AND OPTICAL GRANULATED SUBSTANCE SORTER EQUIPPED WITH AIR-BLOWING MEANS THAT USES THIS PIEZOELECTRIC VALVE (71) Applicants: SATAKE CORPORATION, Tokyo (JP); MECHANO TRANSFORMER CORPORATION, Rm 114, Kawasaki-shi, Kanagawa (JP); KURODA PNEUMATICS LTD., Asahi-shi, Chiba (JP)

(72) Inventors: Takafumi Ito, Mihara (JP); Sze Keat Chee, Tokyo (JP); Takeshi Yano, Fujisawa (JP); Takeshi Kamima, Asahi (JP); Toshitada Hirata, Narita (JP); Toshiro Higuchi, Tokyo (JP)

(73) Assignees: SATAKE CORPORATION, Tokyo (JP); MECHANO TRANSFORMER, Tokyo (JP); KURODA PNEUMATICS, LTD., Chiba (JP)

( * ) Notice: Subject to any disclaimer, the term of this patent is extended or adjusted under 35 U.S.C. 154(b) by 0 days.

(21) Appl. No.: 14/364,673

(22) PCT Filed: Nov. 29, 2012

(86) PCT No.: PCT/JP2012/007678
§ 371 (c)(1),
(2) Date: Jun. 12, 2014

(87) PCT Pub. No.: WO2013/088661
PCT Pub. Date: Jun. 20, 2013

(65) Prior Publication Data
US 2014/0339141 A1 Nov. 20, 2014

(30) Foreign Application Priority Data

Dec. 13, 2011 (JP) ................. 2011-272819

(51) Int. Cl.
F16K 31/02 (2006.01)
B07C 5/342 (2006.01)
(Continued)

(52) U.S. Cl.
CPC ................. *F16K 31/02* (2013.01); *B07B 11/00* (2013.01); *B07C 5/3425* (2013.01); *B07C 5/366* (2013.01); *F16K 31/004* (2013.01); *B07C 2501/009* (2013.01)

(58) Field of Classification Search
CPC ...... B07C 5/3425; B07C 5/342; B07C 5/366; B07C 5/3422; B07C 5/365; B07C 5/36; B07C 11/00; B07C 2501/009; F16K 31/02; F16K 31/004
USPC .................................. 209/587, 580, 644, 639
See application file for complete search history.

(56) References Cited

U.S. PATENT DOCUMENTS 4,513,868 A 4/1985 Culling et al.
6,131,879 A 10/2000 Kluge et al.
(Continued)

FOREIGN PATENT DOCUMENTS

JP 57-130579 A 8/1982
JP 62-283274 A 12/1987
(Continued)

*Primary Examiner* — David H Bollinger
(74) *Attorney, Agent, or Firm* — Orion Consulting, Ltd.; Joseph P. Farrar (57) ABSTRACT A piezoelectric valve whose assembly work can be efficiently performed. A piezoelectric valve according to this invention includes a valve main body having a gas pressure chamber which receives compressed gas supplied from the outside, a plate which is disposed inside the valve main body and is fixed to the valve main body, and actuators each of which has a valve element, a piezoelectric element generating, in the form of a displacement, driving force required for operation of the valve element, and a displacement magnification mechanism for magnifying a displacement of the piezoelectric element and causing the magnified displacement to act on the valve element, are fixed to each of two surfaces of the plate, and are disposed inside the valve main body together with the plate.

4 Claims, 6 Drawing Sheets (51) Int. Cl.
  *B07C 5/36* (2006.01)
  *B07B 11/00* (2006.01)
  *F16K 31/00* (2006.01)

(56) References Cited

U.S. PATENT DOCUMENTS 6,189,858 B1 * 2/2001 Miyazoe et al. ......... 251/129.06
7,360,750 B2 * 4/2008 Yano et al. ............... 251/129.07
8,662,312 B2 * 3/2014 Ito et al. ....................... 209/552
2011/0284431 A1 * 11/2011 Ito et al. ....................... 209/552

FOREIGN PATENT DOCUMENTS

| JP | 10-510040 A | 9/1998 |
| JP | 2002-001232 A | 1/2002 |
| JP | 2004-316835 A | 11/2004 |

* cited by examiner

PIEZOELECTRIC VALVE, AND OPTICAL GRANULATED SUBSTANCE SORTER EQUIPPED WITH AIR-BLOWING MEANS THAT USES THIS PIEZOELECTRIC VALVE

TECHNICAL FIELD

The present invention relates to a piezoelectric valve which uses a displacement of a piezoelectric element to open and close a valve and an optical granular object sorting machine which includes an air-jet unit using the piezoelectric valve.

BACKGROUND ART

There has been known an optical granular object sorting machine which blows away granular objects, such as a grain of cereal or a resin pellet, with an air jet to sort good pieces from defective pieces and removes a foreign object or the like mixed in granular objects with an air jet.

A granular object sorting machine of this type blows away a granular object dropping along a predetermined path from an end portion of a conveyance passage with an air jet based on a signal indicating detection of a defective piece or the like, thereby sorting out the granular object.

The above-described granular object sorting machine blows away a defective piece or the like among granular objects dropping in succession in large amounts with a jet of air. In order to blow away only a defective piece or the like in question with high accuracy without involving other granular objects, the granular object sorting machine needs to provide an air-jet nozzle with a valve with high responsiveness.

For this reason, there is proposed a piezoelectric air valve which can open and close a valve at high speed through use of a piezoelectric element (see Patent Literature 1).

The piezoelectric air valve disclosed in Patent Literature 1 takes advantage of properties of a piezoelectric element excellent in high-speed response performance. The piezoelectric air valve includes a displacement magnification mechanism for magnifying a small displacement of a piezoelectric through leverage.

In the piezoelectric air valve, when a voltage is applied to a piezoelectric element, a displacement in a direction of elongation of the piezoelectric element is transmitted to a valve element via the displacement magnification mechanism. The valve element is quickly moved to open the valve.

In the piezoelectric air valve, when the voltage application to the piezoelectric element is terminated, restoring force associated with restoration to normal state of the piezoelectric element is transmitted to the valve element via the displacement magnification mechanism. The valve element is quickly brought into contact with a valve seat to close the valve.

An optical granular object sorting machine which includes an air-jet nozzle using the above-described piezoelectric air valve blows away a defective piece or the like with high accuracy and is at low risk of involving good pieces or the like in front and behind the defective piece or the like because the piezoelectric air valve is more excellent in responsiveness at the time of valve opening/closing than a conventional electromagnetic valve.

Many optical granular object sorting machines include an air-jet nozzle using a multi-valve unit composed of a plurality of valves provided in parallel to efficiently sort out granular objects.

To construct a multiple air valve using the piezoelectric air valve disclosed in Patent Literature 1, unitary air valves, the number of which is equal to the number of valves required, need to be coupled. Assembly work of the multiple air valve thus takes a long time.

CITATION LIST

Patent Literature

Patent Literature 1: Japanese Patent No. 4344164

SUMMARY OF INVENTION

Technical Problem

Under the circumstances, it is an object of the present invention to provide a piezoelectric valve whose assembly work can be performed efficiently.

It is another object of the present invention to provide an optical granular object sorting machine which includes an air-jet unit using the piezoelectric valve, whose assembly work can be efficiently performed.

Solution to Problem

In order to attain the above-described objects, a piezoelectric valve according to the present invention includes a valve main body having a gas pressure chamber which receives compressed gas supplied from the outside, a plate which is disposed inside the valve main body and is fixed to the valve main body, and actuators each of which has a valve element, a piezoelectric element generating, in the form of a displacement, driving force required for operation of the valve element, and a displacement magnification mechanism for magnifying a displacement of the piezoelectric element and causing the magnified displacement to act on the valve element, are fixed to each of two surfaces of the plate, and are disposed inside the valve main body together with the plate.

The piezoelectric valve according to the present invention is preferably such that the actuator integrally includes a valve element, a piezoelectric element generating, in the form of a displacement, driving force required for operation of the valve element, and one pair of displacement magnification mechanisms provided symmetric with respect to an axis in a direction of movement in the valve element for magnifying a displacement of the piezoelectric element and causing the magnified displacement to act on the valve element.

The piezoelectric valve according to the present invention is preferably such that the valve main body is a case which is open at a front surface, the plate is provided integrally with a lid which closes an opening of the case, and such that the lid is provided with a gas discharge path through which the compressed gas is discharged and a valve seat with which the valve element is to come into contact to open and close the gas discharge path.

The piezoelectric valve according to the present invention is preferably such that an inlet for compressed gas to be supplied to the gas pressure chamber is formed in the lid and such that a wiring connector for the piezoelectric element is disposed at the lid.

An optical granular object sorting machine according to the present invention includes a transfer unit configured to transfer an object to be sorted, an optical detection unit configured to detect, at a detection position, an object to be sorted when the object drops from an end portion of the transfer unit, and an air-jet unit which is provided further below the optical detection unit and configured to blow away the object to be sorted with a jet of air based on a result of detection by the optical detection unit, and the air-jet unit includes the above-described piezoelectric valve and drives the piezoelectric valve and jets air based on a result of detection by the optical detection unit.

Advantageous Effects of Invention

In the piezoelectric valve according to the present invention, a plate with actuators fixed to two surfaces thereof can be fixed to a valve main body. This allows efficient assembly work of a piezoelectric valve, especially of a piezoelectric multi-valve unit.

In the piezoelectric valve according to the present invention, the actuators are fixed to the two surfaces of the plate, which allows to narrow the spacing between gas outlets in the multi-valve unit than in a conventional one for miniaturization of the multi-valve unit.

The piezoelectric valve according to the present invention can be assembled through the simple work of assembling the plate to the front surface of the case if the valve main body is a case which is open at a front surface, the plate is provided integrally with a lid which closes an opening of the case, and the lid is provided with a gas discharge path through which the compressed gas is discharged and a valve seat with which the valve element is to come into contact to open and close the gas discharge path.

Assembly work of the piezoelectric valve according to the present invention can be more efficiently performed if an inlet for compressed gas to be supplied to the gas pressure chamber is formed in the lid, and a wiring connector for the piezoelectric element is disposed at the lid.

In the optical granular object sorting machine according to the present invention, the air-jet unit includes the piezoelectric valve. Therefore, assembly work of the optical granular object sorting machine can be efficiently performed.

DESCRIPTION OF EMBODIMENTS

Some embodiments of the present invention will be described with reference to the drawings.
<Piezoelectric Valve>

First Embodiment

Figure 1:
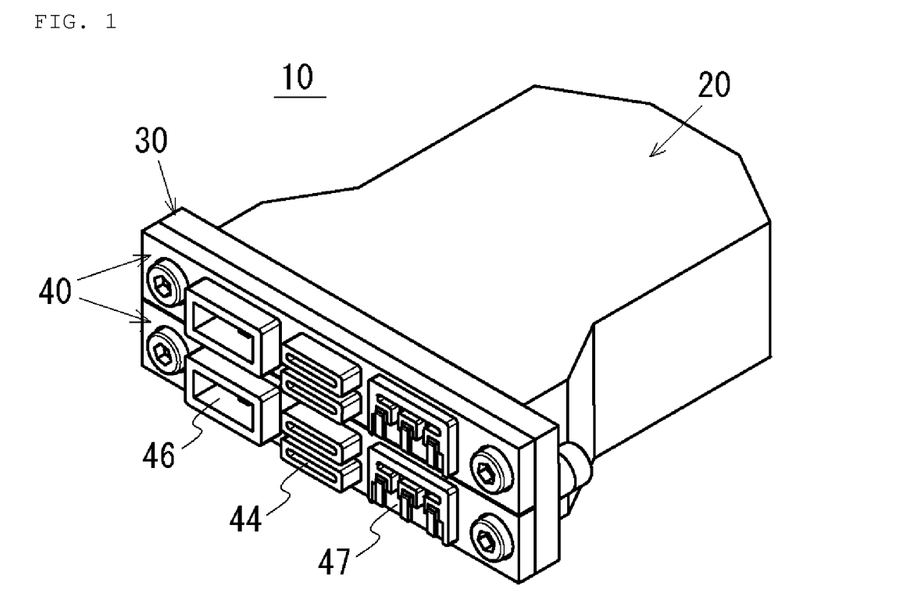
FIG. 1 is a schematic perspective view of a piezoelectric valve according to a first embodiment.
Figure 2:
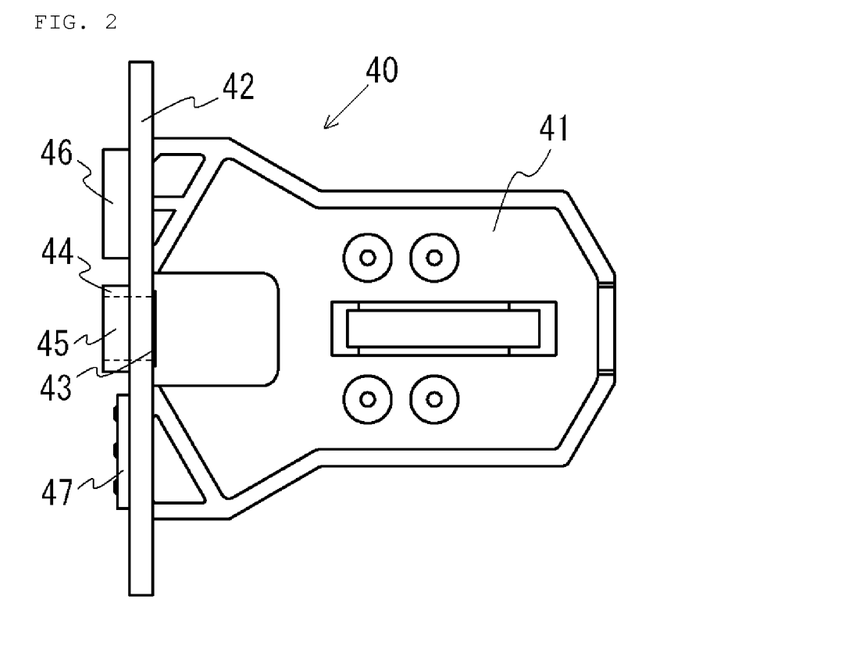
FIG. 2 is a view for explaining a valve seat plate constituting the piezoelectric valve according to the first embodiment.
Figure 3:
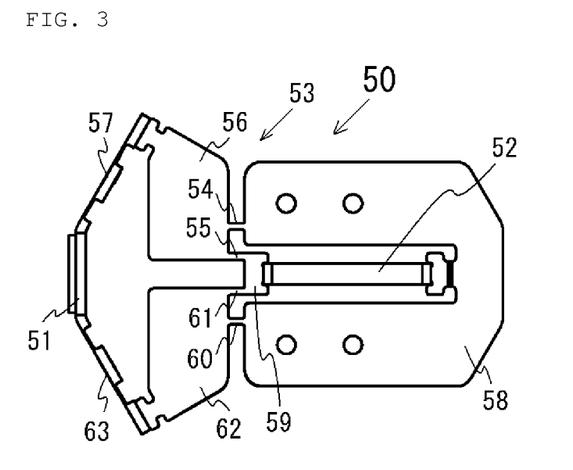
FIG. 3 is a view for explaining an actuator constituting the piezoelectric valve according to the first embodiment.
Figure 4:
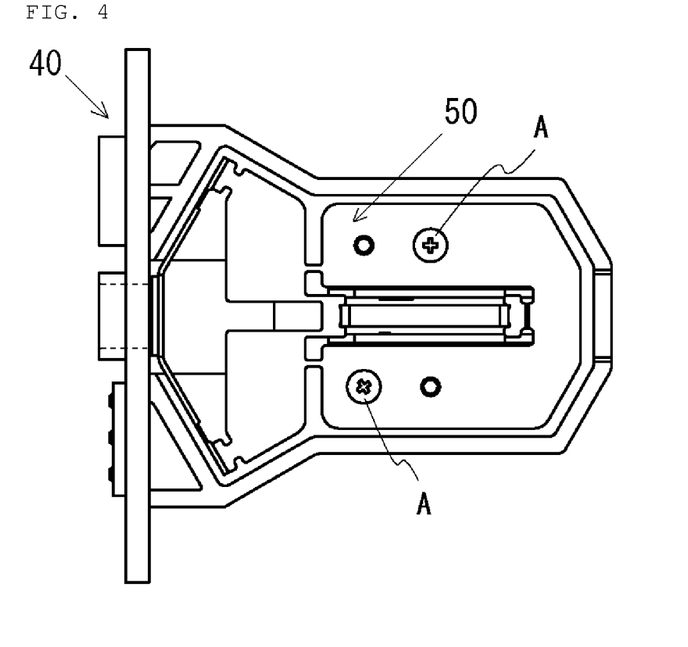
FIG. 4 is a view for explaining a state in which the actuator is attached to the valve seat plate according to the first embodiment.
Figure 5:
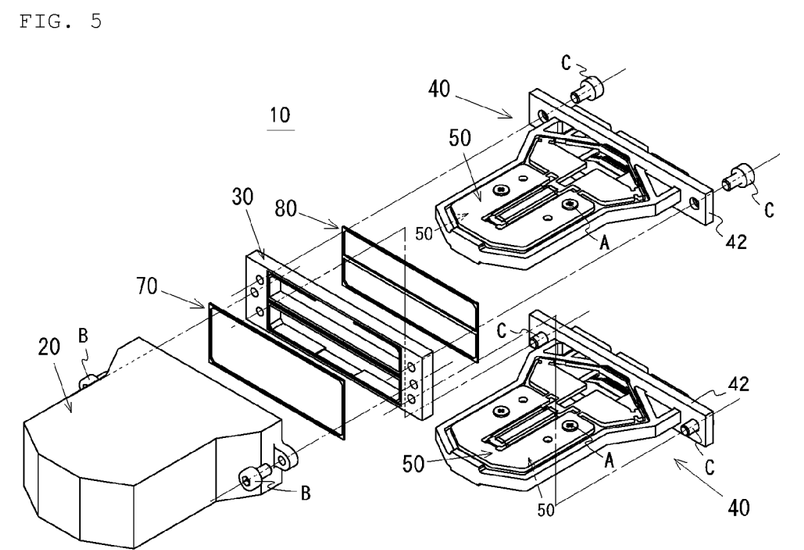
FIG. 5 is an exploded view of the piezoelectric valve according to the first embodiment.

FIG. 1 shows a schematic perspective view of a piezoelectric valve. FIG. 2 shows a view for explaining a valve seat plate constituting the piezoelectric valve. FIG. 3 shows a view for explaining an actuator constituting the piezoelectric valve. FIG. 4 shows a view for explaining a state in which the actuator is attached to the valve seat plate. FIG. 5 shows an exploded view of the piezoelectric valve.

In the present embodiment, a piezoelectric valve 10 includes a valve main body 20, an intermediate spacer 30 which is fixed to a front surface of the valve main body 20 with screws, valve seat plates 40 which are disposed inside the valve main body 20 and are fixed to a front surface of the intermediate spacer 30 with screws, and actuators 50 which are fixed to two surfaces of each valve seat plate 40 with screws.

The valve main body 20 is a case which is open at the front surface and includes, in its inside, a gas pressure chamber which is supplied with compressed gas from an external compressed gas supply source (not shown).

The intermediate spacer 30 includes two through openings.

The valve seat plate 40 includes a mounting portion 41 for the actuators 50 at each surface and integrally includes, at a front portion, a lid 42 which closes the corresponding opening of the case. The lid 42 is provided with two valve seats 43 with which valve bodies, to be described later, of the actuators 50 are to come into contact. The lid 42 also has two gas outlets 44 provided at a front surface, and respective gas discharge paths 45 are formed so as to extend from valve seat planes of the two valve seats 43 and communicate with the gas outlets 44. The lid 42 further has an inlet 46 for compressed gas supplied to the gas pressure chamber provided at the front surface and a wiring connector 47 for a piezoelectric element, to be described later, disposed at the front surface. Wiring from the wiring connector 47 to the piezoelectric element is molded inside the valve seat plate 40. The valve seat plate 40 is integrally molded from, for example, a synthetic resin material.

The actuator 50 includes a valve element 51 made of rubber, preferably smooth rubber, a piezoelectric element 52 which generates, in the form of a displacement, driving force required for operation of the valve element 51, and a displacement magnification mechanism 53 for magnifying the displacement of the piezoelectric element 52 and causing the magnified displacement to act on the valve body 51.

One pair of displacement magnification mechanisms 53 is arranged to be symmetric with respect to an axis in a direction of movement of the valve element 51, i.e., a straight line (hereinafter referred to as a "center line") connecting the valve element 51 and longitudinal axes of the piezoelectric element 52.

A first displacement magnification mechanism has a first hinge 54, a second hinge 55, a first arm 56, and a first plate spring 57. One end of the first hinge 54 is integral with a distal end on one side of a U-shaped base substrate 58, and one end of the second hinge 55 is integral with a cap member 59. One end of the first plate spring 57 is joined to an outer distal end portion of the first arm 56, and a side end portion on one side of the valve element 51 is joined to the other end of the first plate spring 57.

A second displacement magnification mechanism has a third hinge 60, a fourth hinge 61, a second arm 62, and a second plate spring 63. One end of the third hinge 60 is integral with a distal end on the other side of the U-shaped base substrate 58, and one end of the fourth hinge 61 is integral with the cap member 59. One end of the second plate spring 63 is joined to an outer distal end portion of the second arm 62, and a side end portion on the other side of the valve element 51 is joined to the other end of the second plate spring 63.

The displacement magnification mechanisms 53 are formed integrally with the base substrate 58 and the cap member 59 by stamping a metal material, such as a stainless material.

As shown in FIG. 4, the actuator 50 is fixed to the valve seat plate 40 with screws A while the valve element 51 is in contact with the valve seat 43. The actuator 50 has holes whose diameters are larger than a shaft diameter of the screw A, and a state of contact of the valve element 51 with the valve seat 43 can be finely adjusted. Note that the actuators 50 are fixed to the two surfaces of the valve seat plate 40.

In the state shown in FIG. 4, when the piezoelectric element 52 is energized in the actuator 50, the piezoelectric element 52 elongates in a leftward direction in FIG. 3. A displacement induced by the elongation of the piezoelectric element 52 is magnified in accordance with the principle of leverage with the first hinge 54 as a fulcrum, the second hinge 55 as a point of effort, and the outer distal end portion of the first arm 56 as a point of load in the first displacement magnification mechanism, to largely displace the outer distal end portion of the first arm 56. The displacement induced by the elongation of the piezoelectric element 52 also largely displaces the outer distal end portion of the second arm 62 in the second displacement magnification mechanism because the third hinge 60 acts as a fulcrum, the fourth hinge 61 acts as a point of effort, and the outer distal end portion of the second arm 62 acts as a point of load.

The respective displacements of the outer distal end portion of the first arm 56 and the outer distal end portion of the second arm 62 separate the valve element 51 from the valve seat 43 via the first plate spring 57 and the second plate spring 63 to open the gas discharge path 45.

When the piezoelectric element 52 is de-energized in the actuator 50, the piezoelectric element 52 contracts. The contraction seats the valve element 51 on the valve seat 43 via the first and second displacement magnification mechanisms to close the gas discharge path 45.

As shown in FIG. 5, in the above-described piezoelectric valve 10, the intermediate spacer 30 is first fixed to the case front surface of the valve main body 20 with screws B while the intermediate spacer 30 is in contact with the case front surface via a gasket 70 sandwiched therebetween. The valve seat plates 40 having the actuators 50 fixed thereto are inserted into the case of the valve main body 20 via the openings of the intermediate spacer 30. After that, the lids 42 of the valve seat plates 40 are fixed to the front surface of the intermediate spacer 30 with screws C while the lids 42 are in contact with the front surface via a gasket 80 sandwiched therebetween. The piezoelectric valve 10 is assembled in this manner.

In the piezoelectric valve 10, the intermediate spacer 30 has the two openings, into which the valve seat plate 40 is insertable, and the actuators 50 are fixed to the two surfaces of each valve seat plate 40. The piezoelectric valve 10 is thus a piezoelectric multi-valve unit composed of four valves provided in parallel which share the gas pressure chamber.

As for the above-described piezoelectric valve 10, the number of valves in a piezoelectric multi-valve unit can be increased by providing the piezoelectric valves 10 in parallel.

In the piezoelectric valve 10, the number of valves can also be changed by changing the width of the case of the valve main body 20 to change the number of valve seat plates 40 to be inserted into the case.

In the piezoelectric valve 10 according to the present embodiment, the valve seat plate 40 with the actuators 50 fixed to the two surfaces thereof can be fixed to the valve main body 20. This allows efficient assembly work of a piezoelectric valve, especially a piezoelectric multi-valve unit.

In the piezoelectric valve 10 according to the present embodiment, the actuators 50 are fixed to the two surfaces of each valve seat plate 40. The spacing between gas outlets can be made smaller in the piezoelectric multi-valve unit than in a conventional one. This allows miniaturization of a piezoelectric multi-valve unit.

The piezoelectric valve 10 according to the present embodiment can be assembled through the simple work of assembling the valve seat plate 40 integrally including the lid 42 to the case front surface of the valve main body 20.

In the piezoelectric valve 10 according to the present embodiment, for example, even if a plurality of cases of the valve main bodies 20 are provided in parallel, the work of attaching or detaching each valve seat plate 40 can be performed from the front surface of the corresponding case, and the other cases do not interfere with the work. This significantly improves the efficiency of assembly work and maintenance work, as compared to before.

In the piezoelectric valve 10 according to the present embodiment, the inlet 46 for compressed air to be supplied to the gas pressure chamber is formed in the lid 42, and the wiring connector 47 for the piezoelectric element is disposed at the lid 42. This allows more efficient assembly work and maintenance work.

Note that a unit for fixing the intermediate spacer 30 to the case front surface of the valve main body 20 and a unit for fixing the lid 42 of the valve seat plate 40 to the front surface of the intermediate spacer 30 are not particularly limited to screws in the piezoelectric valve 10 according to the present embodiment and that, for example, welding may be used.

In the piezoelectric valve 10 according to the present embodiment, assembly can also be efficiently performed even by fixing the above-described members through welding or the like. It is, of course, understood that, if the members are detachably fixed with screws, the valve seat plate 40 is easily removed from the valve main body 20, and maintenance work is more efficiently performed.

Another embodiment of the present invention will be described.

Second Embodiment

Figure 6:
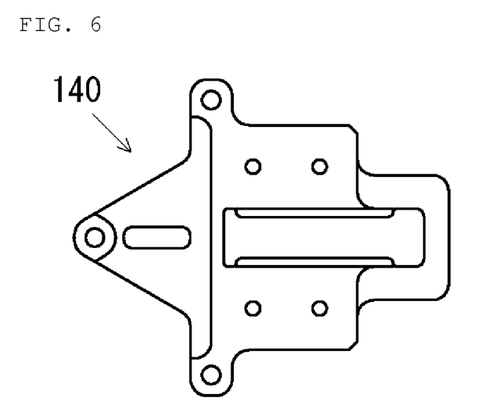
FIG. 6 is a view for explaining a plate constituting a piezoelectric valve according to a second embodiment.
Figure 7:
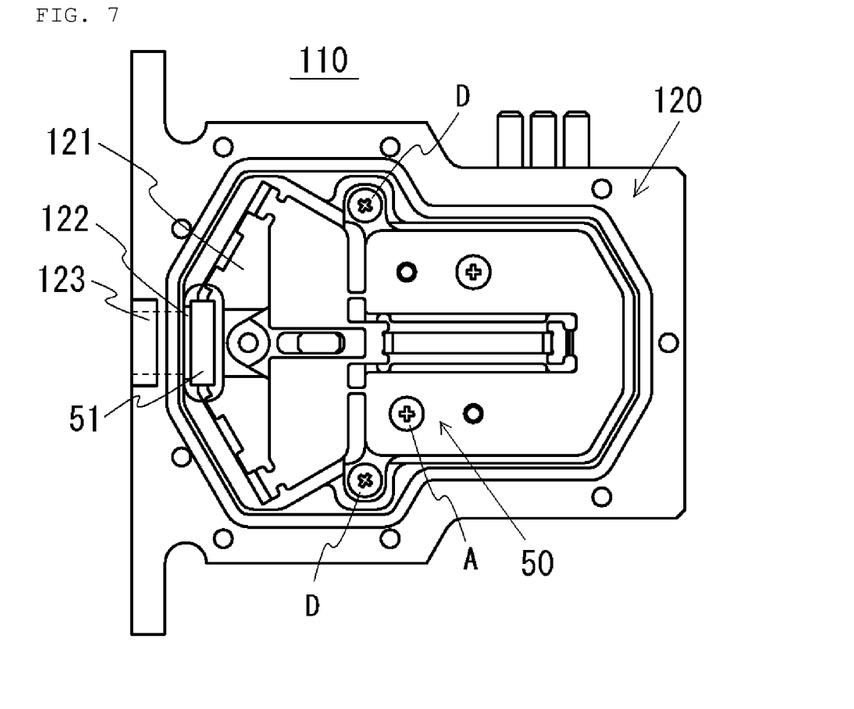
FIG. 7 is a view for schematically explaining the piezoelectric valve according to the second embodiment.

FIG. 6 shows a view for explaining a plate constituting a piezoelectric valve. FIG. 7 shows a view for schematically explaining the piezoelectric valve.

In the present embodiment as well, a plate 140 includes a mounting portion for an actuator 50 at each surface. Since the actuator 50 shown in FIG. 3 is used as the actuator 50, a description thereof will be omitted.

As shown in FIG. 7, a piezoelectric valve 110 according to the present embodiment has a case in which a side surface of a valve main body 120 is open. The plate 140 is incorporated into the case from the side surface and is fixed with screws D.

A gas pressure chamber 121 which is supplied with compressed gas from an external compressed gas supply source (not shown) is formed in the valve main body 120. In the valve main body 120, a plurality of valve seats 122, with each of which a valve element 51 of the actuator 50 is to come into contact, and a plurality of gas discharge paths 123, each of which extends from a valve seat plane of the valve seat 122 and communicates with the outside and jets compressed gas inside the gas pressure chamber 121 to the outside, are formed so as to correspond in number to the actuators 50.

Thus, the piezoelectric valve 110 according to the present embodiment also allows constitution of a piezoelectric multi-valve unit composed of a plurality of valves provided in parallel which share a gas pressure chamber.

As for the piezoelectric valve 110 according to the present embodiment, the number of valves in a piezoelectric multi-valve unit can be increased by providing the piezoelectric valves 110 in parallel.

Note that the piezoelectric valve 110 according to the present embodiment is, of course, used while the side surface of the valve main body 120 is hermetically sealed with a lid member or the like.

In the present embodiment as well, in the piezoelectric valve 110, the plate 140 with the actuators 50 fixed to the two surfaces thereof is fixed to the valve main body 120. This allows efficient assembly work of a piezoelectric valve, especially a piezoelectric multi-valve unit.

In the piezoelectric valve 110 according to the present embodiment, the above-described members can be fixed by welding or the like, including the case where the lid member is fixed to the side surface of the valve main body 120.

<Optical Granular Object Sorting Machine>

An optical granular object sorting machine which includes an air-jet nozzle using a piezoelectric valve according to one of the above-described embodiments will be described.

Figure 8:
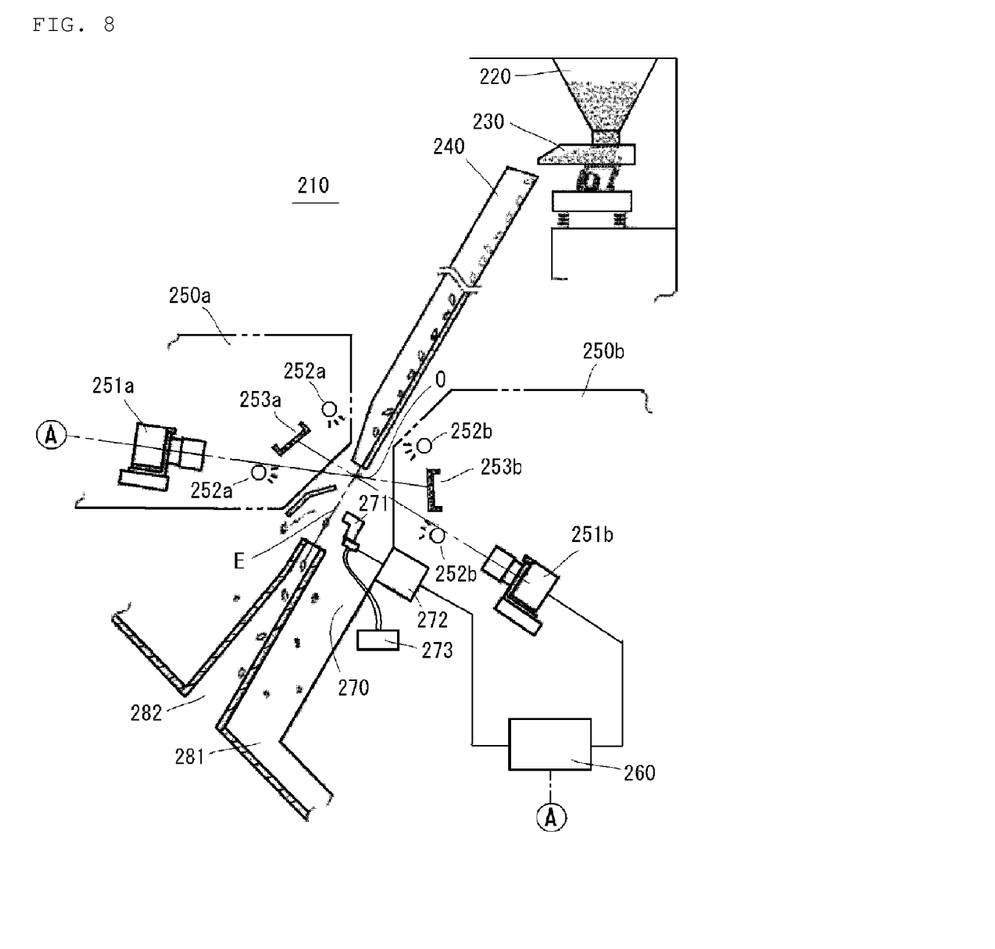
FIG. 8 is a cross-sectional side view of a main portion of an optical granular object sorting machine.
Figure 9:
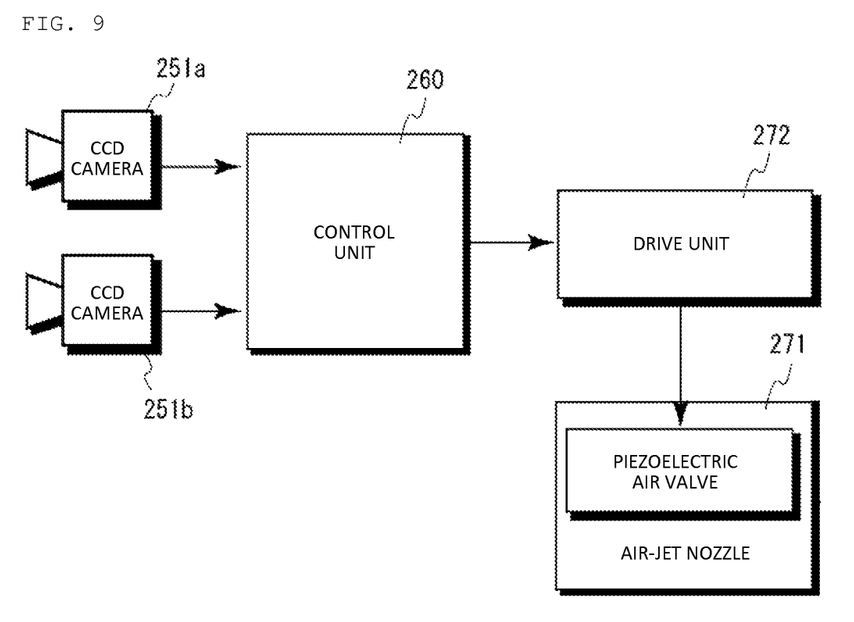
FIG. 9 is a control block diagram of the optical granular object sorting machine.

FIG. 8 shows a cross-sectional side view of a main portion which is a simplified representation of the internal structure of an optical granular object sorting machine. FIG. 9 shows a control block diagram in the optical granular object sorting machine.

An optical granular object sorting machine 210 has, at an upper portion, a granular object supply portion which is composed of a tank 220 and a vibrating feeder 230. An inclined chute 240 which has a predetermined width is arranged below the granular object supply portion.

Granular objects supplied from the granular object supply portion flow in succession by gravity while spreading in a width direction on the inclined chute 240 and then are released from a lower end into the air along a predetermined dropping path.

At least one pair of optical detection devices 250a and 250b which pick up images of granular objects at a granular object detection position O extending linearly and parallel to the width direction of the inclined chute 240 is disposed in front of and behind the predetermined dropping path so as to face each other. The optical detection devices 250a and 250b are composed of, e.g., image pickup units 251a and 251b, such as a CCD camera, which incorporate CCD line sensors, illumination units 252a and 252b which are made up of fluorescent lamps or the like, and backgrounds 253a and 253b which serve as backdrops at the time of the image pickup of the granular objects.

An air-jet device 270 which removes a defective piece or the like with a jet of air is disposed below the granular object detection position O. The air-jet device 270 includes an air-jet nozzle 271 which incorporates a plurality of above-described piezoelectric valves 10 or 110 provided in parallel and a compressed air supply device 273 which feeds compressed air to the air-jet nozzle 271. The air-jet device 270 blows away granular objects released from the lower end of the inclined chute 240 through jetting of air from a plurality of nozzle holes of the air-jet nozzle 271 which are provided corresponding to positions in a width direction of the granular object dropping path, based on results of detection in the optical detection devices 250a and 250b. Note that the piezoelectric elements 52 of the piezoelectric valves 10 or 110 are electrically connected to a driving circuit of a drive unit 272.

In the optical granular object sorting machine 210, granular objects which flow in succession by gravity while spreading in the width direction on the inclined chute 240 and are then released from the lower end into the air along the predetermined dropping path are subjected to image pickup at the granular object detection position O by the image pickup units 251a and 251b of the optical detection devices 250a and 250b, and pieces of image pickup data are fed to a control unit 260. The control unit 260 identifies a granular object to be removed, such as a defective piece, based on the pieces of image pickup data and acquires information on the size and the like of the granular object. The control unit 260 sends an elimination signal for the defective piece or the like to the drive unit 272.

The air-jet device 270 selectively drives one of the plurality of piezoelectric valves 10 or 110 based on the elimination signal sent to the drive unit 272 and jets air from the nozzle holes of the air-jet nozzle 271 that are provided corresponding to the positions in the width direction to the defective piece or the like passing through a granular object elimination position E extending linearly and parallel to the width direction of the inclined chute 240.

The defective piece or the like blown away by an air jet from the nozzle holes of the air-jet nozzle 271 is discharged to outside the machine through a defective piece delivery port 281. A good piece or the like passing through the predetermined dropping path without being blown away by an air jet is collected from a good piece delivery port 282.

A granular object serving as an object to be sorted in the above-described optical granular object sorting machine is typified by a grain of cereal, especially a grain of rice. The object to be sorted is not limited to a grain of cereal and may be any other object as long as the object has a size and a mass small enough to blow away with an air jet.

As has been described above, in the above-described optical granular object sorting machine, since the air-jet nozzle 271 includes the above-described piezoelectric valve unit 10, assembly work of the air-jet nozzle 271 can be efficiently performed.

Note that an actuator of a piezoelectric valve according to the present invention is not limited to the ones described in the embodiments.

For example, the actuator may be one in which displacement magnification mechanisms are arranged asymmetric with respect to an axis in a direction of movement of a valve element, or may be one with only one displacement magnification mechanism is arranged.

The actuator may be one in which a valve element is joined to one end of an arm member.

The actuator may not be one in which a longitudinal axis of a piezoelectric element does not coincide with a direction of movement of a valve element.

The present invention is not limited to the above-described embodiments. It is, of course, understood that the configurations of the embodiments may be appropriately changed without departing from the scope of the invention.

INDUSTRIAL APPLICABILITY

Assembly work of a piezoelectric valve according to the present invention can be efficiently performed, and the piezoelectric valve is thus of vital use.

REFERENCE SIGNS LIST 10 piezoelectric valve
20 valve main body
30 intermediate spacer
40 valve seat plate 41 actuator mounting portion
42 lid
43 valve seat
44 gas outlet
45 gas discharge path
46 compressed gas inlet
47 wiring connector
50 actuator
51 valve element
52 piezoelectric element
53 displacement magnification mechanism
54 first hinge
55 second hinge
56 first arm
57 first plate spring
58 base substrate
59 cap member
60 third hinge
61 fourth hinge
62 second arm
63 second plate spring
110 piezoelectric valve
120 valve main body
121 gas pressure chamber
122 valve seat
123 gas discharge path
140 plate
210 optical granular object sorting machine
240 inclined chute
250a, 250b optical detection device
251a, 251b CCD camera (image pickup unit)
260 control unit
270 air-jet device
271 air-jet nozzle
273 compressed air supply device
A, B, C, D screw

What is claimed is:

1. A piezoelectric valve comprising:
a valve main body having a gas pressure chamber which receives compressed gas supplied from the outside;
a plate which is disposed inside the valve main body and is fixed to the valve main body; and
actuators each of which has a valve element, a piezoelectric element generating, in the form of a displacement, driving force required for operation of the valve element, and a displacement magnification mechanism for magnifying a displacement of the piezoelectric element and causing the magnified displacement to act on the valve element, are fixed to each of two surfaces of the plate, and are disposed inside the valve main body together with the plate.

2. The piezoelectric valve according to claim 1, wherein
the valve main body is a case which is open at a front surface, and
the plate is provided integrally with a lid which closes an opening of the case, and the lid is provided with a gas discharge path through which the compressed gas is discharged and a valve seat with which the valve element is to come into contact to open and close the gas discharge path.

3. An optical granular object sorting machine comprising a transfer unit configured to transfer an object to be sorted, an optical detection unit configured to detect, at a detection position, an object to be sorted when the object drops from an end portion of the transfer unit, and an air-jet unit which is provided further below the optical detection unit and configured to blow away the object to be sorted with a jet of air based on a result of detection by the optical detection unit,
wherein the air-jet unit includes a piezoelectric valve according to claim 1 and drives the piezoelectric valve and jets air based on a result of detection by the optical detection unit.

4. A piezoelectric valve comprising:
a valve main body having a gas pressure chamber which receives compressed gas supplied from the outside;
a plate which is disposed inside the valve main body and is fixed to the valve main body; and
actuators each of which has a valve element, a piezoelectric element generating, in the form of a displacement, driving force required for operation of the valve element, and a displacement magnification mechanism for magnifying a displacement of the piezoelectric element and causing the magnified displacement to act on the valve element, are fixed to each of two surfaces of the plate, and are disposed inside the valve main body together with the plate,
wherein the valve main body is a case which is open at a front surface, the plate is provided integrally with a lid which closes an opening of the case, and the lid is provided with a gas discharge path through which the compressed gas is discharged and a valve seat with which the valve element is to come into contact to open and close the gas discharge path, and
wherein an inlet for compressed gas to be supplied to the gas pressure chamber is formed in the lid, and a wiring connector for the piezoelectric element is disposed at the lid.

* * * * *